US009454870B2

(12) United States Patent
Carpenter et al.

(10) Patent No.: US 9,454,870 B2

(45) Date of Patent: Sep. 27, 2016

(54) ANALYZING WIRELESS SIGNALS IN WAGERING GAME ENVIRONMENTS

(75) Inventors: Jerome Carpenter, Woodridge, IL (US); James E. Motyl, Chicago, IL (US); Craig J. Sylla, Round Lake, IL (US); Muthu Velu, Addison, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 1733 days.

(21) Appl. No.: 12/521,267

(22) PCT Filed: Jan. 11, 2008

(86) PCT No.: PCT/US2008/050868

§ 371 (c)(1), (2), (4) Date: Jul. 1, 2009

(87) PCT Pub. No.: WO2008/089068

PCT Pub. Date: Jul. 24, 2008

(65) Prior Publication Data

US 2010/0081501 A1 Apr. 1, 2010

Related U.S. Application Data

(60) Provisional application No. 60/885,836, filed on Jan. 19, 2007.

(51) Int. Cl.
*A63F 13/00* (2014.01)
*G07F 17/32* (2006.01)

(52) U.S. Cl.
CPC ........... *G07F 17/3223* (2013.01); *G07F 17/32* (2013.01); *G07F 17/3234* (2013.01)

(58) Field of Classification Search
CPC ........................ G07F 17/3225; G07F 17/3227
USPC ........................................ 463/30, 40, 41, 42
See application file for complete search history.

(56) References Cited

U.S. PATENT DOCUMENTS

| | | | | |
|---|---|---|---|---|
| 2001/0034237 | A1 | 10/2001 | Garahi | |
| 2004/0028123 | A1 | 2/2004 | Sugar et al. | |
| 2005/0159212 | A1 | 7/2005 | Romney et al. | |
| 2005/0187020 | A1 | 8/2005 | Amaitis et al. | |
| 2007/0049229 | A1* | 3/2007 | Finkelstein et al. | 455/270 |
| 2007/0064842 | A1* | 3/2007 | Ross et al. | 375/343 |

OTHER PUBLICATIONS

"PCT Application No. PCT/US2008/050868 International Preliminary Report on Patentability", Aug. 7, 2009 , 12 pages.

* cited by examiner

*Primary Examiner* — James S McClellan
(74) *Attorney, Agent, or Firm* — DeLizio Law, PLLC

(57) ABSTRACT

Systems and methods for analyzing wireless signals in a wagering game environment are described herein. In some embodiment, a wagering game machine includes a wagering game unit configured to present wagering games. The wagering game machine can also include a network interface configured to exchange, with other devices on a wagering game network, information about the wagering games. The wagering game machine can also include a wireless signal detection device configured to detect wireless signals in a wagering game environment and to create wireless signal data for use in determining whether the wireless signals interfere with wireless communications of the wagering game network.

17 Claims, 8 Drawing Sheets

ANALYZING WIRELESS SIGNALS IN WAGERING GAME ENVIRONMENTS

RELATED APPLICATIONS

This application claims the priority benefit of U.S. Provisional Application Ser. No. 60/885,836 filed Jan. 19, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to capturing and analyzing wireless signals in wagering game environments.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a wagering game machine comprises a wagering game unit configured to present wagering games. The wagering game machine can also comprise a network interface configured to exchange, with other devices on a wagering game network, information about the wagering games, and a wireless signal detection device configured to detect wireless signals in a wagering game environment and to create wireless signal data for use in determining whether the wireless signals interfere with wireless communications of the wagering game network.

In some embodiments, the wireless signal data is configured to indicate one or more of the group consisting of frequency components of the wireless signals, network protocols of the wireless signals, and location of the source of the wireless signals.

In some embodiments, the wagering game machine further comprises a wireless signal data processor configured to present the wireless signal data in graphical form.

In some embodiments, the wagering game machine further comprises a wireless signal data processor configured to determine, based on the wireless signal data, whether the wireless signals are interfering with communications of the wagering game network.

In some embodiments, the wireless signal data processor is further configured to notify a wagering game network administrator after a determination that the wireless signals are interfering with the communications of the wagering game network.

In some embodiments, the wagering game machine includes a universal serial bus (USB), wherein the wireless signal detection device is configured to transmit the wireless signal data over the USB.

In some embodiments, a method comprises detecting a wager associated with a wagering game and presenting the wagering game. The method can also include detecting a wireless signal in a wagering game environment, creating data indicating properties of the wireless signal, and submitting the data for analysis.

In some embodiments, before the detecting, the method includes disabling a wireless interface from transmitting wireless signals, and after the detecting, enabling the wireless interface to transmit wireless signals.

In some embodiments, the properties include one or more of frequencies of the wireless signal, amplitudes of the wireless signal, and protocol formats of the wireless signal.

In some embodiments, the method further includes presenting the data as a graph, wherein the graph depicts the wireless signal in a frequency domain.

In some embodiments, the wagering game machine is part of a wagering game network and the method further comprises analyzing the data, wherein the analyzing determines whether the wireless signal originates from a device of the wagering game network.

In some embodiments, the method further comprises analyzing the data to determine a device from which the wireless signal originated.

In some embodiments a wagering game network comprises a plurality of wagering game machines, each of the wagering game machines including, a wagering game unit configured to present wagering games, a wireless signal detector device configured to detect wireless signals in a wagering game environment and to create data including an indication of frequency components of the wireless signal, and a network interface configured to transmit the data over the wagering game network. In some embodiments, the wagering game network also includes a wireless signal data analyzer configured to receive data from the wagering game machines and to determine, based on the data, whether the wireless signals are interfering with communications in the wagering game network.

In some embodiments, each of the wagering game machines further includes a wireless signal data processor configured to present a graphical representation of the data, wherein the graphical representation illustrates the frequency components of the wireless signal.

In some embodiments, each of the wagering game machines has a form factor suitable for handheld operation, and wherein the wireless signal data processor is further configured to disable the network interface before the wireless signal detector begins to detect wireless signals.

In some embodiments, the wireless signal data analyzer is further configured to reconfigure wagering game network based on the data.

In some embodiments, the wireless signals originate from devices that are not part of the wagering game network.

In some embodiments, the wireless signal data analyzer is further configured to present a graphical representation of the data, wherein the graphical representation illustrates the frequency components of the wireless signal.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example architectures. The third section describes example operations performed by some embodiments and the fourth section describes example wagering game machines in more detail. The fifth section presents some general comments.

INTRODUCTION

This section provides an introduction to some embodiments of the invention.

Many wagering game networks use wireless technologies for transmitting data between wagering game machines, wagering game servers, and other network components. Because wireless devices (e.g., cell phones, notebook computers, cordless telephones, etc.) are ubiquitous, wagering game networks may encounter interference from non-gaming-related devices. For example, a cordless telephone used in a casino office may interfere with a wagering game machine's wireless transmissions. Such interference can reduce wireless transmission speeds or altogether disable wireless communications. When a wagering game network exhibits problems from wireless interference, finding the source of interference can be difficult, as wireless devices may only sporadically emit interference or they may rapidly migrate through the wagering game environment.

In some embodiments of the invention, a wagering game network includes components for detecting wireless signals in a wagering game environment and creating wireless signal data. If communication problems arise in the wagering game network, some embodiments can analyze the wireless signal data to identify sources of interference. Additionally, some embodiments can analyze the wireless signal data to detect interference before it affects the wagering game network. The discussion of FIG. 1 describes these and other concepts in more detail.

Figure 1:
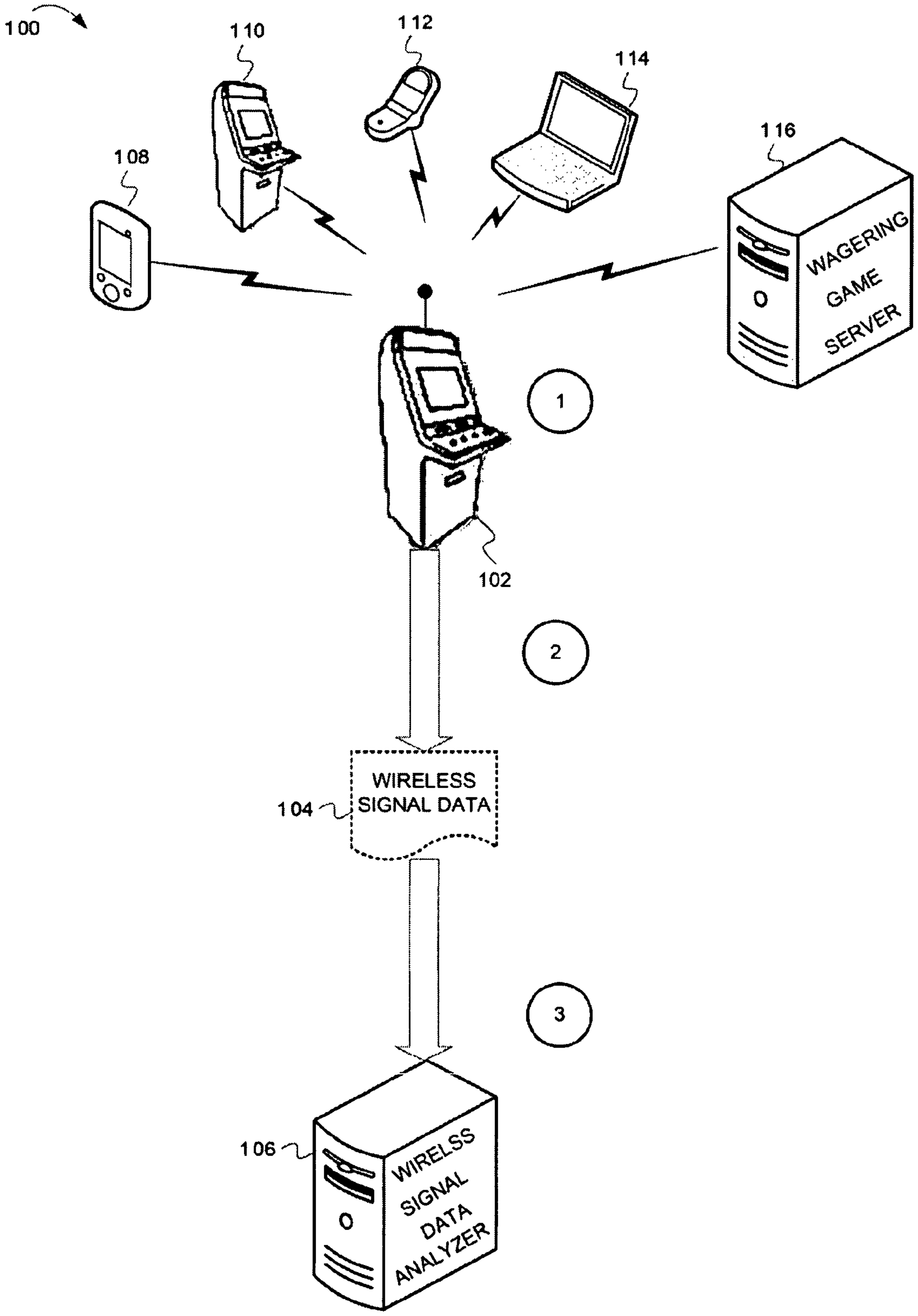
FIG. 1 is a diagram illustrating data flow and operations for capturing and analyzing RF signals in a wagering game environment, according some embodiments of the invention.

FIG. 1 is a diagram illustrating data flow and operations for detecting and analyzing wireless signals in a wagering game environment, according some embodiments of the invention. In FIG. 1, a wagering game network includes wagering game machines 102 & 110, wagering game server 116, and wireless signal data analyzer 106. In addition to components of the wagering game network, the wagering game environment 100 includes a personal digital assistant (PDA) 108, cell phone 112, and laptop computer 114. In the wagering game network, the components wirelessly exchange information using radio signals. For example, the wagering game machines 102 & 110 can wirelessly receive content from the wagering game server 116 via Wi-Fi signals. The cell phone 112, PDA 108, and laptop computer 114 can also emit radio signals, which may interfere with wagering game network transmissions. In some embodiments, the wagering game machine 102 can detect wireless signals in the wagering game environment 100 and create wireless signal data. The wireless signal data analyzer 106 can analyze the wireless signal data and, if needed, take measures to restore communications. In some embodiments, the detection and analysis process includes three stages.

During stage one, the wagering game machine 102 detects wireless signals in the wagering game environment 100 and creates wireless signal data. The wireless signal data can represent signals from any wireless device in the wagering game environment 100. During stage two, the wagering game machine 100 transmits the wireless signal data 104 to the wireless signal data analyzer 106 for storage and analysis. During stage three, the wireless signal data analyzer 106 analyzes the wireless signal data. Based its analysis, some embodiments of the analyzer 106 can identify interference sources, preemptively recommend alternative network configurations, enhance security, and/or take other measures to restore communications in the wagering game network.

Although FIG. 1 describes some embodiments, the following sections describe additional features and embodiments.

Example Architectures

This section describes structural features of some embodiments. In particular, this section describes example wagering game network architectures and wagering game machine architectures.

Wagering Game Networks

Figure 2:
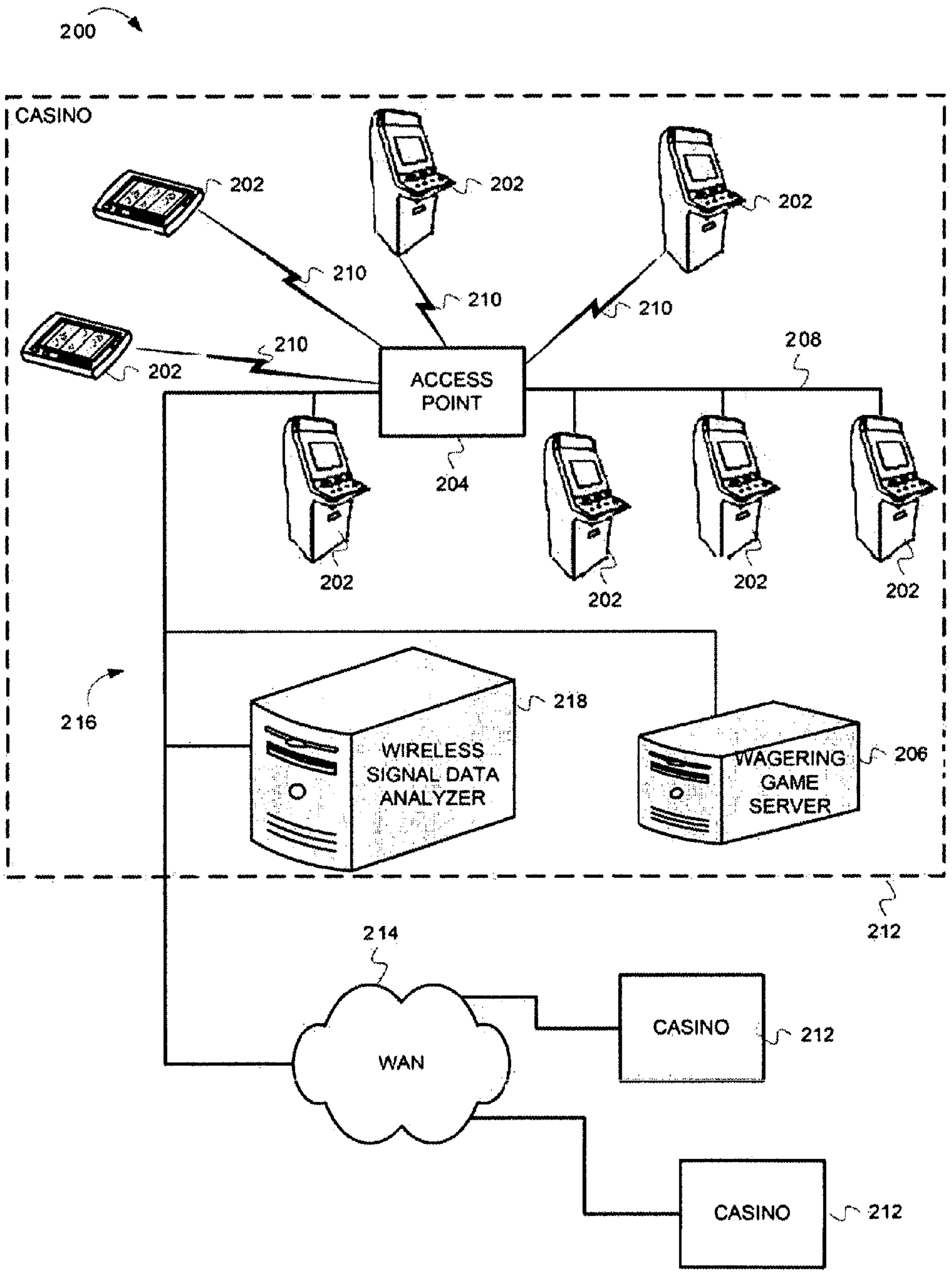
FIG. 2 is a block diagram illustrating a wagering game network 200, according to example embodiments of the invention.

FIG. 2 is a block diagram illustrating a wagering game network 200, according to example embodiments of the invention. In FIG. 2, the wagering game network 200 includes a plurality of casinos 212 connected to a wide area network (WAN) 214.

Each casino 212 includes a local area network (LAN) 216, which includes an access point 204, wireless signal data analyzer 218, wagering game machines 202, and wagering game server 206. The access point 204 provides wireless communication links 210 and wired communication links 208 to devices on the LAN 216. The wired and wireless communication links can employ any suitable connection technology, such as Bluetooth, 802.11, Ethernet, public switched telephone networks, SONET, etc.

The wireless signal data analyzer 218 (hereinafter "analyzer 218") can receive and analyze wireless signal data, where the wireless signal data is associated with wireless signals in a casino 212 or other wagering game environment. The analyzer 218 can analyze data created by any suitable device, such as a wagering game machine 202, a dedicated handheld detection device (see discussion of FIG. 4), etc. In some embodiments, the analyzer 218 can make visual representations of the wireless signal data, determine sources of the wireless signals (device and/or location), and take actions (e.g., configure network devices, adjust security settings, etc.) based on analysis of the wireless capture data. Although FIG. 2 shows the wireless signal data analyzer 218 as a standalone server, it can be integrated into the wagering game machines 202, the wagering game server 206, or any other suitable device.

In some embodiments, the wagering game server 206 can serve wagering games and distribute content to devices located in the casinos 212 or at other locations on the WAN 214. The wagering game machines 202 described herein can take any suitable form, such as floor standing models, handheld models, bartop models, workstation-type console models, etc. The wagering game machines 202 can include components for detecting wireless signals (e.g., radio signals), as described below. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, player tracking servers, and/or other devices suitable for use in connection with embodiments of the invention.

In some embodiments, wagering game machines 202 and wagering game servers 206 work together such that a wagering game machine 202 can be operated as a thin, thick, or intermediate client. For example, one or more elements of game play may be controlled by the wagering game machine 202 (client) or the wagering game server 206 (server). Game play elements can include executable game code, lookup tables, configuration files, game outcome, audio or visual representations of the game, game assets or the like. In a thin-client example, the wagering game server 206 can perform functions such as determining game outcome or managing assets, while the wagering game machine 202 can present a graphical representation of such outcome or asset modification to the user (e.g., player). In a thick-client example, the wagering game machines 202 can determine game outcomes and communicate the outcomes to the wagering game server 206 for recording or managing a player's account.

In some embodiments, either the wagering game machines 202 or the wagering game server 206 can provide functionality that is not directly related to game play. For example, account transactions and account rules may be managed centrally (e.g., by the wagering game server 206) or locally (e.g., by the wagering game machine 202). Other functionality not directly related to game play may include power management, presentation of advertising, software or firmware updates, system quality or security checks, etc.

Any of the wagering game network components (e.g., the wagering game machines 202) can include hardware and machine-readable media including instructions for performing the operations described herein. This section continues with a discussion of example wagering game machine architectures.

Wagering Game Machine Architectures

Figure 3:
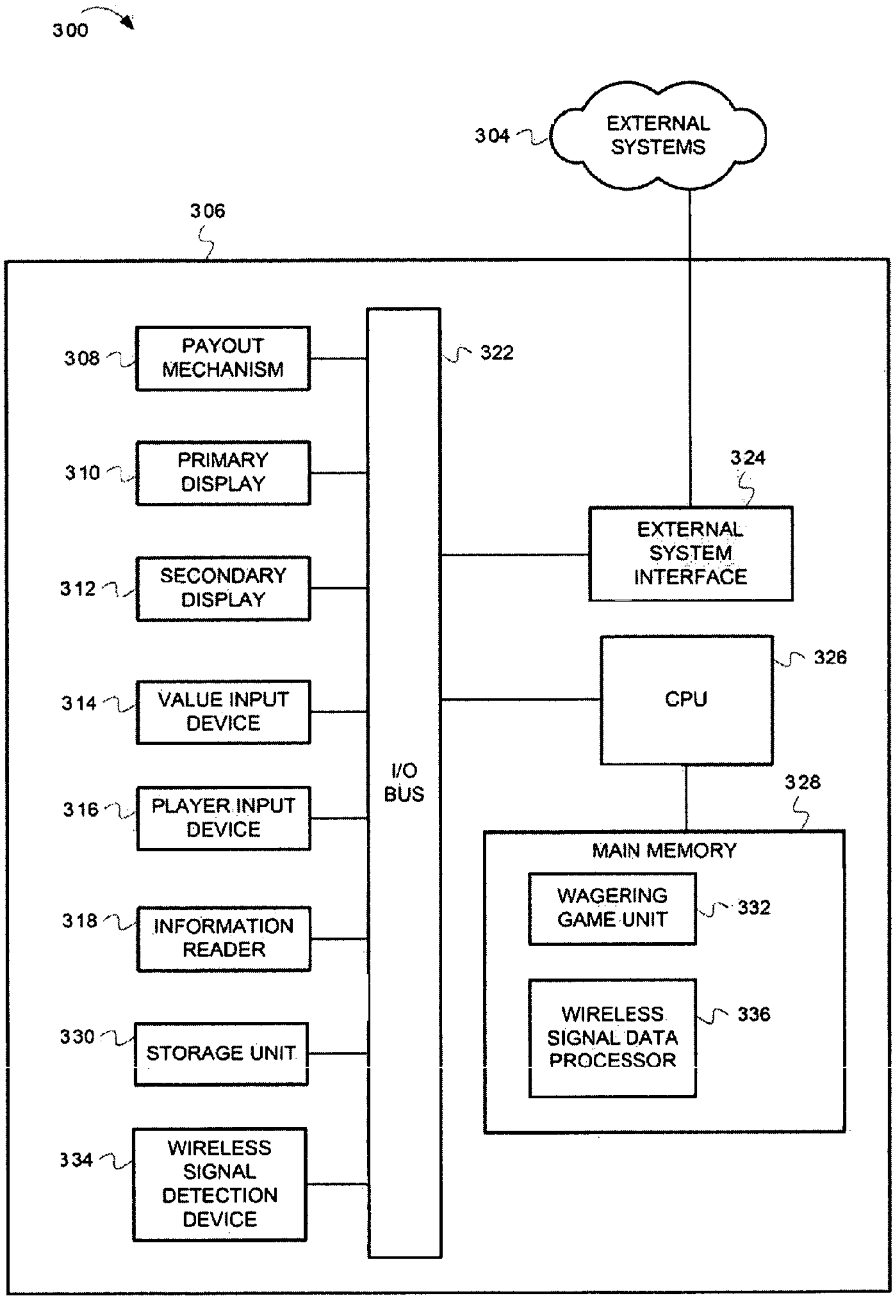
FIG. 3 is a block diagram illustrating a wagering game machine architecture, according to example embodiments of the invention.

FIG. 3 is a block diagram illustrating a wagering game machine architecture, according to example embodiments of the invention. The architecture 300 could be implemented in a free standing console-type machine, handheld machine, or other suitable machine. As shown in FIG. 3, the wagering game machine architecture 300 includes a wagering game machine 306, which includes a central processing unit (CPU) 326 connected to main memory 328. The CPU 326 can include any suitable processor, such as an Intel® Pentium processor, Intel® Core 2 Duo processor, AMD Opteron™ processor, or UltraSPARC processor. The main memory 328 includes a wagering game unit 332. In one embodiment, the wagering game unit 332 can present wagering games, such as video poker, video black jack, video slots, video lottery, etc., in whole or part.

The CPU 326 is also connected to an input/output (I/O) bus 322, which can include any suitable bus technologies, such as an AGTL+ frontside bus, a PCI backside bus, a universal serial bus, etc. The I/O bus 322 is connected to a payout mechanism 308, primary display 310, secondary display 312, value input device 314, player input device 316, information reader 318, and storage unit 330. The player input device 316 can include the value input device 314 to the extent the player input device 316 is used to place wagers. The I/O bus 322 is also connected to an external system interface 324, which is connected to external systems 304 (e.g., wagering game networks).

The I/O bus 322 is also connected to a wireless signal detection device 334 that can capture data associated with wireless signals in a gaming environment. For example, in some embodiments, the wireless signal detection device 334 (hereinafter "detection device 334") can detect radio frequency (RF) signals, such as Wi-Fi signals, Bluetooth signals, and the like. Alternatively, in some embodiments, the detection device 334 can capture other signals, such as infrared signals, laser signals, visible light signals, acoustic signals, etc.

In some embodiments, the detection device 334 can include a wireless spectrum analyzer, such as the Wi-Spy™ spectrum analyzer (available from Metageek, LLC), Omni-Wireless Sensor™ (available from Wildpackets), AirMagnet Enterprise Analyzer (available from AirMagnet), or any other suitable wireless detection device. In some embodiments, after the detection device 334 detects data related to wireless signals, the wireless signal data processor 336 can transmit the wireless signal data to a wireless signal data analyzer (e.g., see FIG. 2) or other remote system. However, in some embodiments, the data processor 336 itself analyzes the wireless signal data in a manner similar to embodiments of the data analyzer 218 (see discussion above). For example, some embodiments of the data processor 336 can produce graphical representations based on the capture data, identify and locate devices based on the capture data, alter security configures based on the capture data, and take measures to restore communications in the wagering game network.

In some embodiments, the wagering game machine 306 can include additional peripheral devices and/or more than one of each component shown in FIG. 3. For example, in one embodiment, the wagering game machine 306 can include multiple external system interfaces 324 and/or multiple CPUs 326. In some embodiments, any of the components can be integrated or subdivided.

Any component of the architecture 300 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Wireless Spectrum Analysis Architecture for Wagering Game Environment

Figure 4:
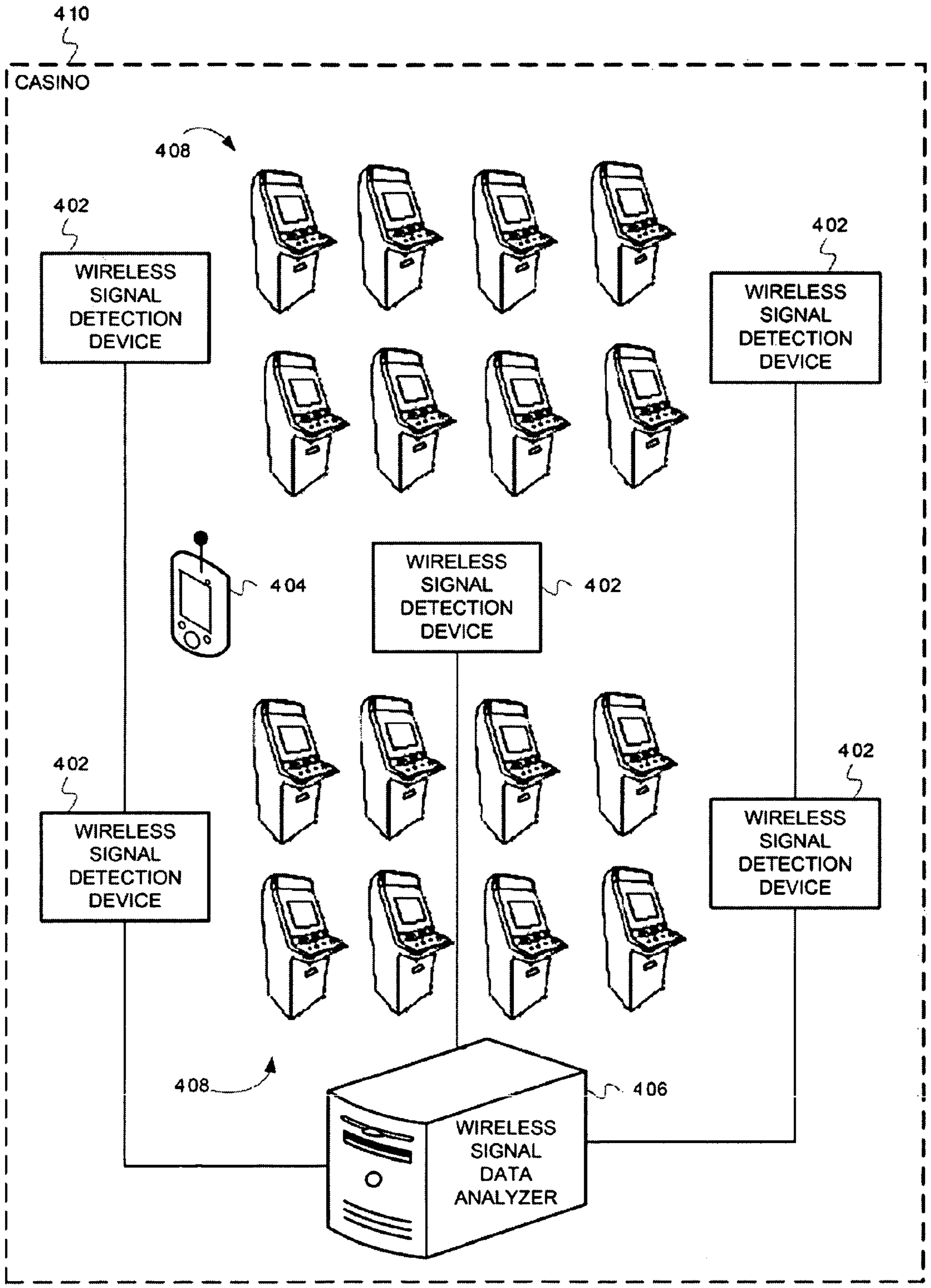
FIG. 4 is a block diagram illustrating a system for analyzing wireless spectrums in a wagering game environment, according to example embodiments of the invention.

FIG. 4 is a block diagram illustrating a system for analyzing wireless spectrums in a wagering game environment, according to example embodiments of the invention. In FIG. 4, the casino 410 includes banks of wagering game machines 408 and a number of wireless signal detection devices 402 (hereinafter "detection devices 402") connected to a wireless signal data analyzer 406 (hereinafter "data analyzer 406"). The detection devices 402 can be placed throughout the casino floor (e.g., adjacent the banks, as shown in FIG. 4) to detect wireless signals that may interfere with the wireless communications of the wagering game machines or other wagering game network devices. Also one or more of the wagering game machines 408 can include detection devices, as described above. FIG. 4 also shows a handheld detection device 404, which has a form factor similar to a personal digital assistant and can be carried about the casino floor. The handheld detection device 404 can detect wireless signals and create wireless signal data while moving about the casino 410. In some embodiments, the detection devices 402, handheld detection device 404, and wagering game machines capture and submit the data to the data analyzer 406.

Example Operations

This section describes operations associated with some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel.

Figure 5:
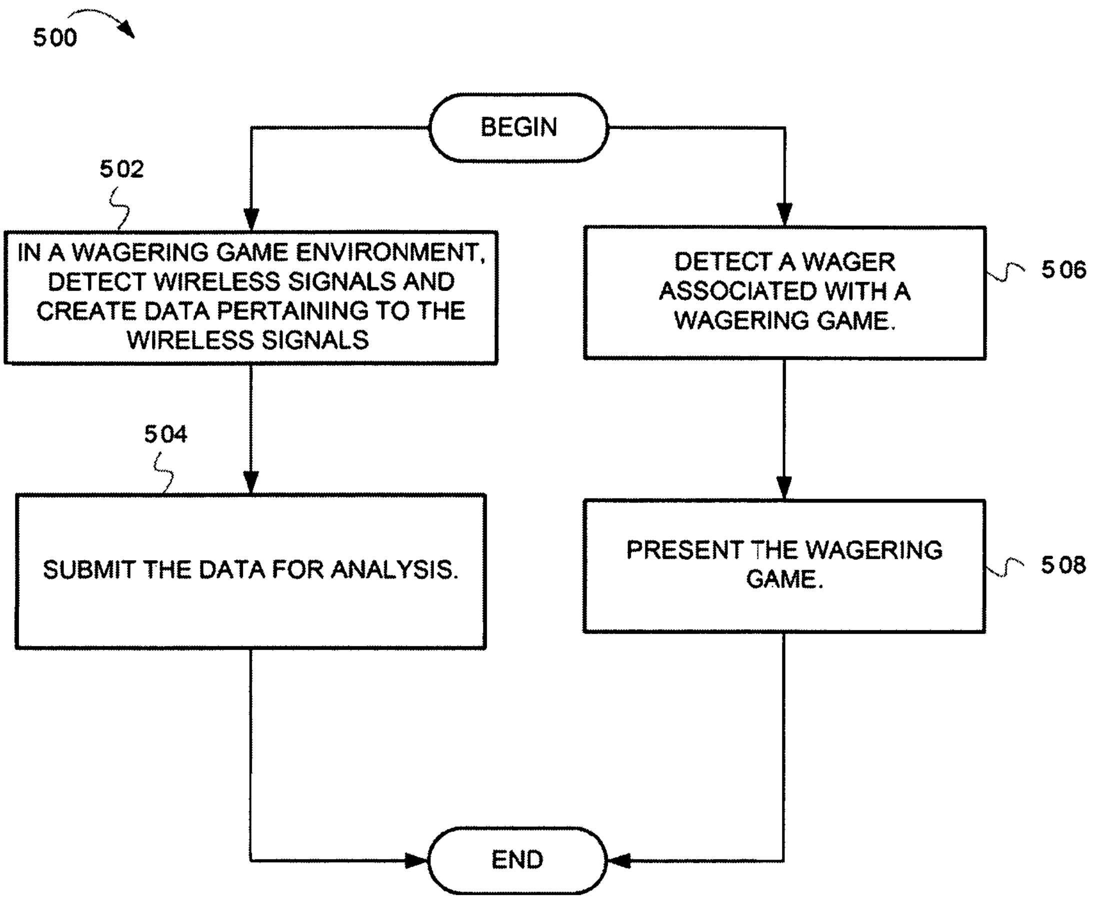
FIG. 5 is a flow diagram illustrating operations for detecting wireless signals in wagering game machine, according to example embodiments of the invention.
Figure 6:
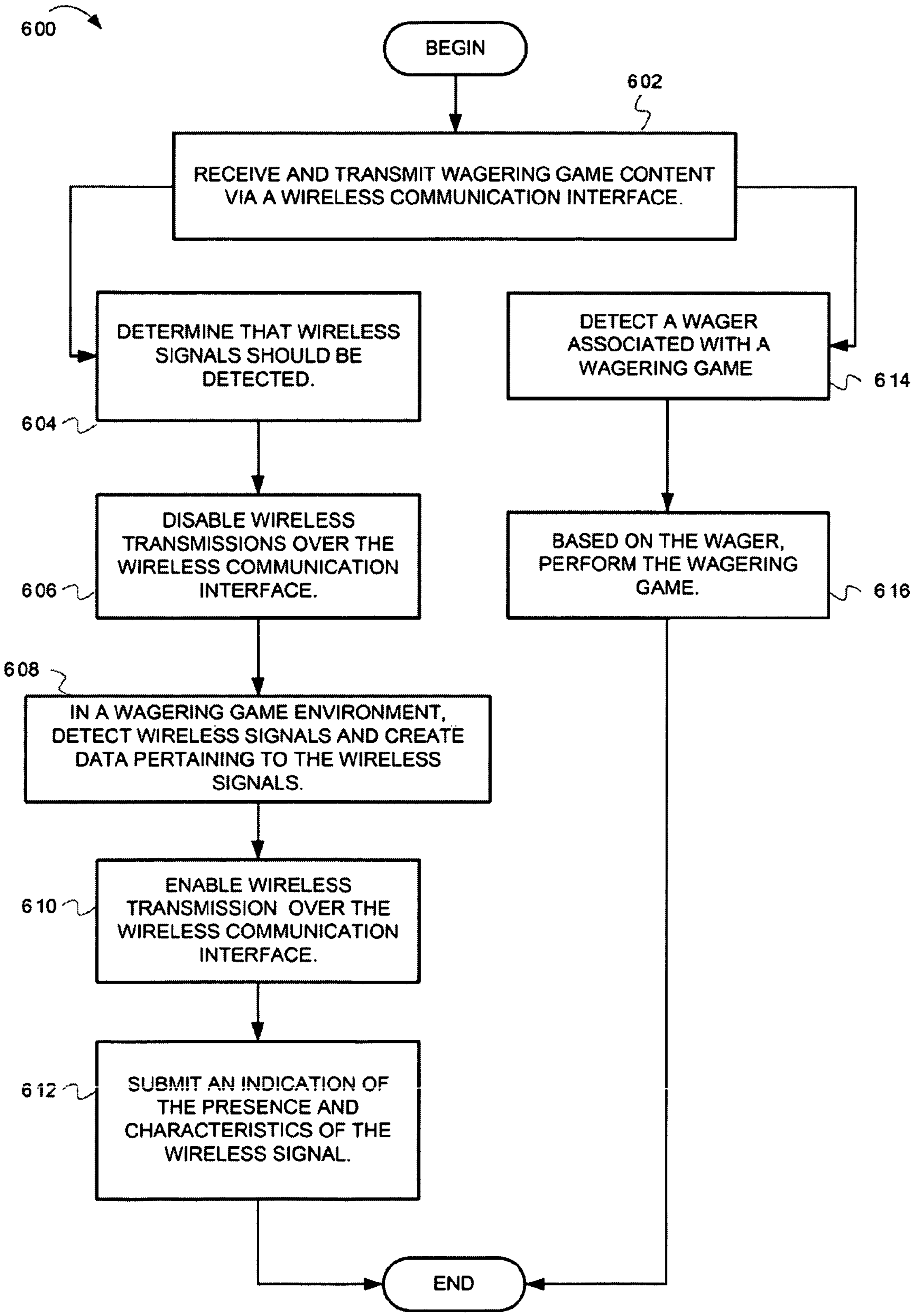
FIG. 6 is a flow diagram illustrating operations for detecting wireless signals and creating wireless signal data in a wireless wagering game network device, according to example embodiments of the invention.
Figure 7:
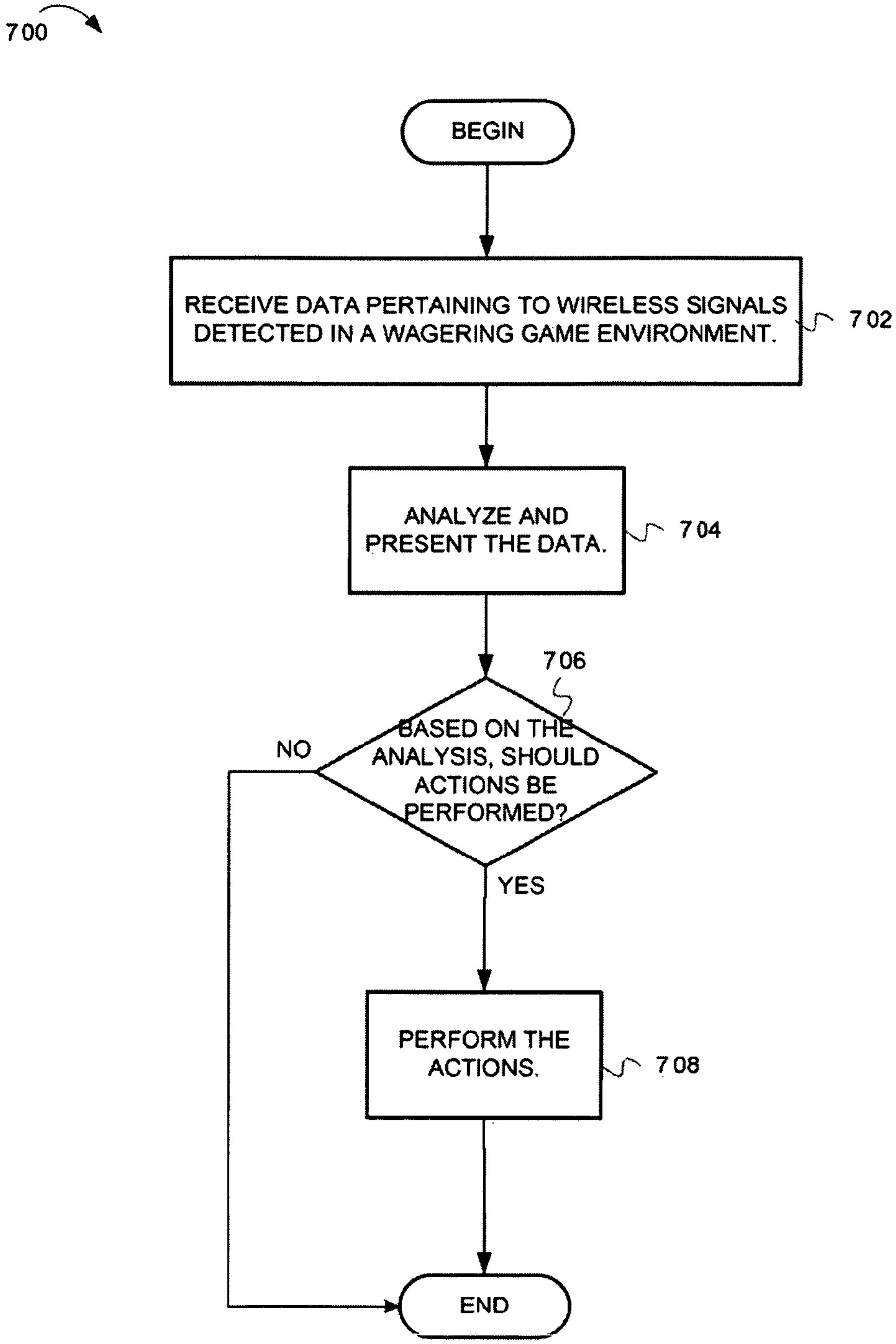
FIG. 7 is a flow diagram illustrating operations for analyzing and responding to data pertaining to wireless signals of a wagering game environment, according to example embodiments of the invention.

This section will discuss FIGS. 5-7. FIGS. 5 and 6 describe operations for detecting wireless signals and creating data pertaining to the wireless signals. FIG. 7 describes operations for analyzing the wireless signal data.

Detecting and Creating Wireless Signal Data

FIG. 5 is a flow diagram illustrating operations for detecting wireless signals in wagering game machine, according to example embodiments of the invention. The flow includes two parallel paths beginning at blocks 502 and 506.

Referring to the left-side path of FIG. 5, at block 502, a wagering game machine's detection device 334 detects wireless signals and creates data pertaining to the wireless signals. For example, the detection device 334 detects wireless signals originating from a wagering game machine 408 or from non-wagering-game-related devices, such as cell phones, cell phone towers, PDAs, laptop computers, satellites, etc. In some embodiments, the detection device 334 can detect Wi-Fi signals, Bluetooth signals, mobile phone signals (e.g., GSM signals), etc. After the detection device 334 detects wireless signals, some embodiments create data indicating electromagnetic characteristics of the wireless signals, such as sinusoid and harmonic components of the wireless signals. The data can also indicate protocols, data payloads, and other information. In some embodiments, the data is in a format suitable for rendering graphical images which indicate frequency content, protocol conformance, data payload content, and other signal qualities.

In some embodiments, the detection device 334 does not detect the wireless signals and create the wireless signal data to facilitate communications over a wagering game network. Instead, the detection device 334 creates the wireless signal data as part of a process for addressing interference, security breaches, and other wagering game network issues. The flow continues at block 504.

At block 504, the wagering game machine's detection device 334 submits the data to a wireless signal data analyzer (e.g. a data analyzer 406). The detection device 334 can submit the data over a wired network or via in any other suitable manner that makes the data accessible to the data analyzer 406. After block 504, the flow ends.

Referring to the right-side path of FIG. 5, at block 506, the wagering game machine 306 detects a wager associated with a wagering game, such as slots, video poker, video black Jack, etc. The flow continues at block 508.

At block 508, the wagering game machine 306 presents the wagering game, which can include paying any winning wagers. From block 508, the flow ends.

In the discussion of FIG. 5, a wagering game machine component (i.e., the detection device 334) performs the operations of blocks 502 & 504. However, in other embodiments, devices other than wagering game machines can perform these operations while omitting the operations at block 506 & 508. For example, in some embodiments, a handheld detection device 404 or a detection device 402 can perform the operations at blocks 502 & 504.

This section continues with a discussion of operations for detecting wireless signals and creating wireless signal data in a wireless device, such as a handheld wagering game machine or other wireless wagering game network device.

FIG. 6 is a flow diagram illustrating operations for detecting wireless signals and creating wireless signal data in a wireless wagering game network device, according to example embodiments of the invention. The flow 600 begins at block 602.

At block 602, a handheld wagering game machine 202 exchanges wagering game content (e.g., wagering game results, audio content, video content, configuration information, etc.) via a wireless communication interface (e.g., external system interface 324). The flow continues in parallel at blocks 604 & 616.

At block 604, the handheld wagering game machine 202 determines that a wireless signals should be detected. The handheld wagering game machine 202 can make this determination based on user input, a remote signal, software invocation, etc. The flow continues at block 606.

At block 606, the handheld machine 202 disables wireless transmissions over its external system interface 324. In some embodiments, disabling the interface 324 enables the handheld machine's detection device 334 to detect wireless signals without being overwhelmed by wireless transmissions from the interface 324. The flow continues at block 608.

At block 608, handheld machine's detection device 334 detects wireless signals and creates data pertaining to the wireless signals. For example, the detection device 334 detects wireless signals present in a wagering game environment. The wireless signals can originate from cell phones, cell phone towers, PDAs, laptop computers, satellites, etc. The wireless signals can be Wi-Fi signals, Bluetooth signals, mobile phone signals (e.g., GSM signals), etc. After the detection device 334 detects wireless signals, some embodiments create data indicating characteristics of the wireless signals. For example, the detection device 334 can create data indicating the signals' frequency content, such as sinusoid and harmonic components, and other signal qualities (see above). The flow continues at block 610.

At block 610, the handheld machine 202 enables wireless transmissions over its external system interface 324. After the wireless signals are detected, the interface 324 can resume wireless transmissions without overwhelming the detection device 334. The flow continues at block 612.

At block 612, the handheld machine's detection device 334 submits the data to a wireless signal data analyzer (e.g. the data analyzer 218). The detection device 334 can submit the wireless signal data via transmission over a wired network or via any other suitable operations that make the wireless signal data accessible to the data analyzer 406. After block 612, the flow ends.

As noted, the flow 600 continues from block 602 into blocks 604 & 614. This, discussion above covered the path into block 604. Now the discussion will proceed at block 614. At block 614, the handheld machine 202 detects a wager associated with a wagering game. The flow continues at block 616.

At block 616, the wagering game machine 306 presents the wagering game, which can include paying any winning wagers. From block 616, the flow ends.

Analyzing Wireless Signal Data

The section continues with a discussion of operations for analyzing data pertaining to wireless signals in a wagering game environment.

FIG. 7 is a flow diagram illustrating operations for analyzing and responding to data pertaining to wireless signals of a wagering game environment, according to example embodiments of the invention. The flow 700 begins at block 702.

At block 702, a data analyzer 406 receives data pertaining to wireless signals that were detected in a wagering game environment. The data analyzer 406 can receive the data from a wagering game machine 408, capture device 402, handheld capture device 404, and/or other suitable device. Alternatively, the wireless signal data can be stored in a central repository (not shown) that is accessible to the data analyzer 406. The flow continues at block 704.

At block 704, the data analyzer 406 presents and analyzes the data. The data analyzer 406 can present the data in different forms and perform different analyses. In some embodiments, the data analyzer 406 can present the wireless signal data in graphical form, such as a in frequency domain graph, time domain graph, or other suitable graph. In some embodiments, the data analyzer 406 can relate the wireless signal data to a map of the wagering game environment (e.g., a casino floor). In some embodiments, the data analyzer 406 may not present the data until after analyzing the data or it may not present the data at all.

The data analyzer 406 can perform many different analyses on the wireless signal data. For example, upon initial set-up and installation of a casino's local area wagering game network (see in FIG. 2), the data analyzer 406 can analyze the wireless signal data to determine a baseline for communications in a wagering game environment (e.g., a portion of the casino's floor). Later, the data analyzer 406 can use the baseline to find devices that are interfering with wagering game network communications. The data analyzer 406 can also compare the wireless signal data with a database of known signals. As a result, embodiments of the data analyzer 406 can identify specific wireless devices in a wagering game environment. In some embodiments, the data analyzer's analysis can locate signal sources (e.g., by analyzing wireless signal data from multiple capture devices 402). Therefore, some embodiments of the data analyzer 406 can identify and locate interference sources and other rogue devices. Other embodiments can also perform other suitable analyses. The flow continues at block 706.

At block 706, the data analyzer 406 determines whether to perform actions based on the analysis. If no actions are to be performed (e.g., because the wireless signal data resembles the baseline), the flow ends. Otherwise, the flow continues at block 708.

At block 708, the data analyzer 406 performs actions based on the analysis. For example, if the data analyzer 406 identifies signals that could interfere with wagering game network devices, it could notify casino personnel. As another example, if the data analyzer 406 perceives a security issue, such as a denial of service attack, it can alert security personnel and/or change wagering game network settings to reduce the effects of the security breach. Other embodiments can perform other suitable actions in response to analyses performed at block 704. From block 708, the flow ends.

Example Wagering Game Machines

Figure 8:
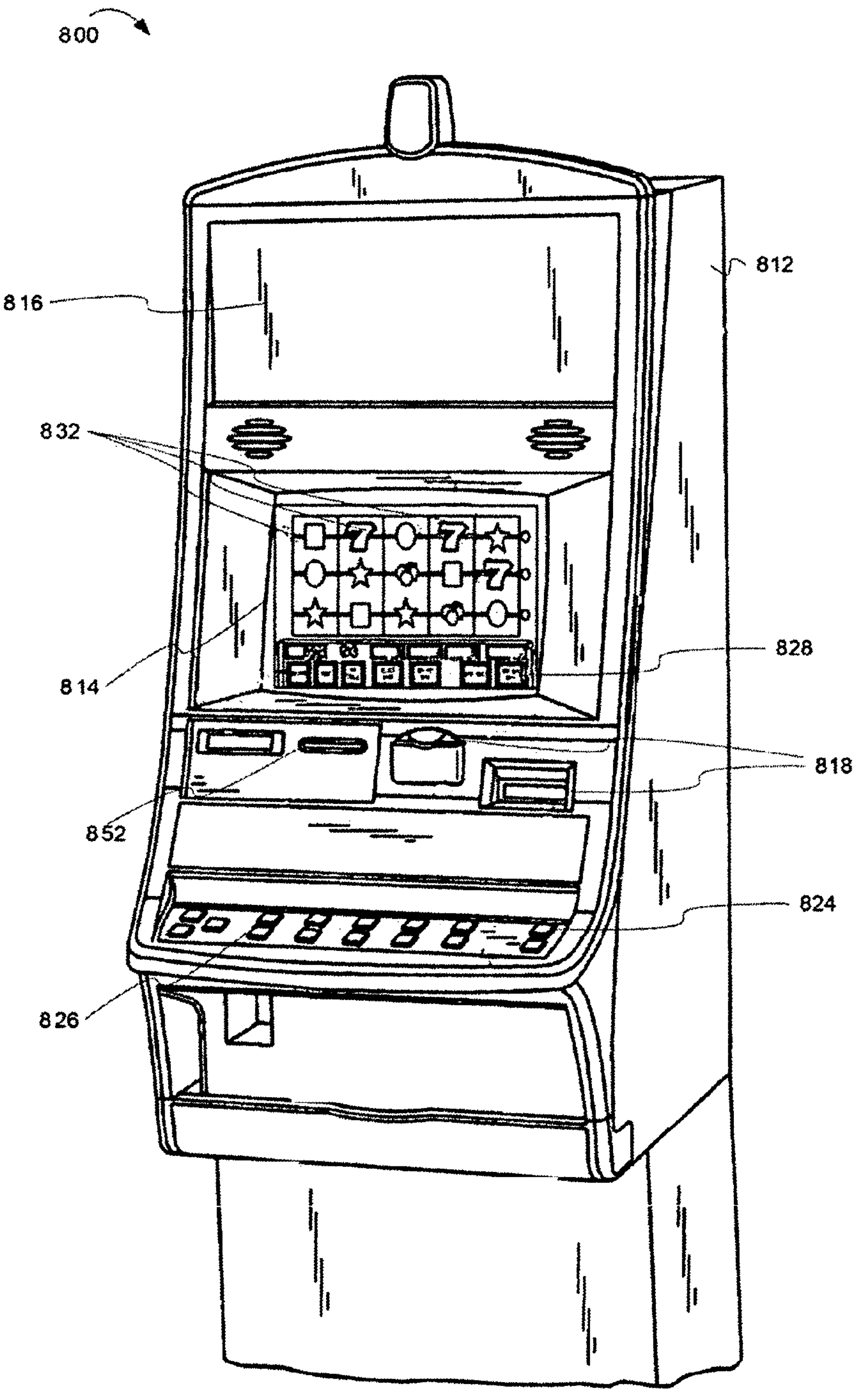
FIG. 8 is a perspective view of a wagering game machine, according to example embodiments of the invention.

FIG. 8 is a perspective view of a wagering game machine, according to example embodiments of the invention. Referring to FIG. 8, a wagering game machine 800 is used in gaming establishments, such as casinos. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A wagering game machine comprising:

a network interface configured to wirelessly exchange, with other devices on a wagering game network, information about wagering games;

a wagering game unit configured to present the wagering games based on the information received via the network interface;

a wireless signal detection device configured to, disable the network interface;

detect, after the network interface is disabled, wireless signals in a wagering game environment and to create wireless signal data for use in determining whether the wireless signals interfere with wireless communications of the wagering game network; and enable, after the detection of the wireless signals in the wagering game environment, the network interface.

2. The wagering game machine of claim 1, the wireless signal data to indicate one or more of the group consisting of frequency components of the wireless signals, network protocols of the wireless signals, and location of the source of the wireless signals.

3. The wagering game machine of claim 1, further comprising a wireless signal data processor configured to present the wireless signal data in graphical form.

4. The wagering game machine of claim 1, further comprising:

a wireless signal data processor configured to determine, based on the wireless signal data, whether the wireless signals are interfering with communications of the wagering game network.

5. The wagering game machine of claim 4, wherein the wireless signal data processor is further configured to notify a wagering game network administrator after a determination that the wireless signals are interfering with the communications of the wagering game network.

6. The wagering game machine of claim 1, wherein the wagering game machine includes a universal serial bus (USB) and wherein the wireless signal detection device is configured to transmit the wireless signal data over the USB.

7. A method for monitoring, from a wagering game machine, wireless signals in a wagering game environment, the method comprising:

detecting a wager associated with a wagering game;

receiving, over a wireless interface configured to transmit and receive wireless signals in the wagering game environment, a result for the wagering game;

presenting the wagering game;

disabling the wireless interface from transmitting wireless signals;

after disabling the wireless interface, detecting a group of one or more wireless signals in the wagering game environment;

after the detecting, enabling the wireless interface to transmit wireless signals;

creating data indicating properties of the group of wireless signals; and submitting the data for analysis.

8. The method of claim 7, wherein the properties include one or more of the group consisting of frequencies of the wireless signals, amplitudes of the wireless signals, and protocol formats of the wireless signals.

9. The method of claim 7, further comprising:

presenting the data as a graph, wherein the graph depicts ones of the group of wireless signals in a frequency domain.

10. The method of claim 7, wherein the wagering game machine is part of a wagering game network, the method further comprising:

analyzing the data, wherein the analyzing determines whether ones of the group of wireless signals originate from a device of the wagering game network.

11. The method of claim 7, further comprising:

analyzing the data to determine a device from which ones of the group of wireless signals originated.

12. A wagering game network comprising:

a plurality of wagering game machines including, a network interface configured to transmit and receive data over the wagering game network;

a wagering game unit configured to present wagering games based on some of the data;

a wireless signal detector device configured to disable the network interface;

detect, after the network interface is disabled, wireless signals in a wagering game environment;

enable the network interface; and create data including an indication of frequency components of the wireless signal;

and a wireless signal data analyzer configured to receive data from the wagering game machines and to determine, based on the data, whether the wireless signals are interfering with communications in the wagering game network.

13. The wagering game network of claim 12, wherein each of the wagering game machines further includes a wireless signal data processor configured to present a graphical representation of the data, wherein the graphical representation illustrates the frequency components of the wireless signal.

14. The wagering game network of claim 12, wherein each of the wagering game machines has a form factor suitable for handheld operation.

15. The wagering game network of claim 12, wherein the wireless signal data analyzer is further configured to reconfigure wagering game network based on the data.

16. The wagering game network of claim 12, wherein the wireless signals originate from devices that are not part of the wagering game network.

17. The wagering game network of claim 12, wherein the wireless signal data analyzer is further configured to present a graphical representation of the data, and wherein the graphical representation illustrates the frequency components of the wireless signals.

* * * * *